United States Patent
Dechamps et al.

(10) Patent No.: US 10,478,884 B2
(45) Date of Patent: Nov. 19, 2019

(54) METHOD AND DEVICE FOR FORMING FROM A FLAT SHEET MATERIAL A CORNER BOUNDED BY THREE SIDES

(71) Applicants: Heinrich Daniel Dechamps, Avon, CT (US); Gerhard Kraus, Vienna (AT)

(72) Inventors: Heinrich Daniel Dechamps, Avon, CT (US); Gerhard Kraus, Vienna (AT)

( * ) Notice: Subject to any disclaimer, the term of this patent is extended or adjusted under 35 U.S.C. 154(b) by 478 days.

(21) Appl. No.: 14/800,155

(22) Filed: Jul. 15, 2015

(65) Prior Publication Data
US 2017/0014884 A1    Jan. 19, 2017

(51) Int. Cl.
*B21D 5/04* (2006.01)
*B21D 19/04* (2006.01)
*B23D 15/00* (2006.01)
*B21D 51/52* (2006.01)

(52) U.S. Cl.
CPC ............ *B21D 19/043* (2013.01); *B21D 5/04* (2013.01); *B21D 51/52* (2013.01); *B23D 15/002* (2013.01)

(58) Field of Classification Search
CPC .......... B21D 5/16; B21D 11/02; B21D 19/04; B21D 19/043; B21D 39/021; B21D 51/263; B21D 51/52; B21D 5/029; B21D 5/04; B23D 15/002; B26D 3/14
See application file for complete search history.

(56) References Cited

U.S. PATENT DOCUMENTS

| 48,516 A | * | 7/1865 | Chambers | B21D 39/021 72/220 |
| 3,264,730 A | * | 8/1966 | Roper | B21D 53/74 219/101 |
| 4,483,227 A | * | 11/1984 | Camisa | B23D 15/002 144/217 |
| 4,729,273 A | * | 3/1988 | Fazis | B23D 15/002 144/217 |
| 4,958,545 A | * | 9/1990 | Lenzotti | B23D 15/002 83/559 |
| 5,701,776 A | * | 12/1997 | Cowan | B21D 51/16 72/332 |
| 5,740,713 A | * | 4/1998 | Korb | B26D 3/14 83/582 |
| 5,819,578 A | * | 10/1998 | Codatto | B21D 13/02 72/379.2 |
| 5,943,899 A | * | 8/1999 | Jung | B21D 51/52 72/212 |
| 6,047,585 A | | 4/2000 | Haslinger | |
| 6,895,796 B2 | | 5/2005 | Harmeter | |
| 7,043,952 B2 | * | 5/2006 | Kraus | B21D 19/043 72/203 |

FOREIGN PATENT DOCUMENTS

DE    4009466 A1    9/1991
JP    61-7024 A  *  1/1986  ............. B21D 28/32

OTHER PUBLICATIONS

Translation, DE 4009466A1, Sep. 1991.*

* cited by examiner

*Primary Examiner* — Edward T Tolan
(74) *Attorney, Agent, or Firm* — Robert S. Smith

(57) ABSTRACT

A method and apparatus for forming and trimming an associated corner region formed from a flat plate. A die and a knife assembly includes a die that is movable in opposed reciprocating directions within a first plane. A support assembly for the corner region holds the corner region at oblique angle with respect to the plane.

6 Claims, 9 Drawing Sheets

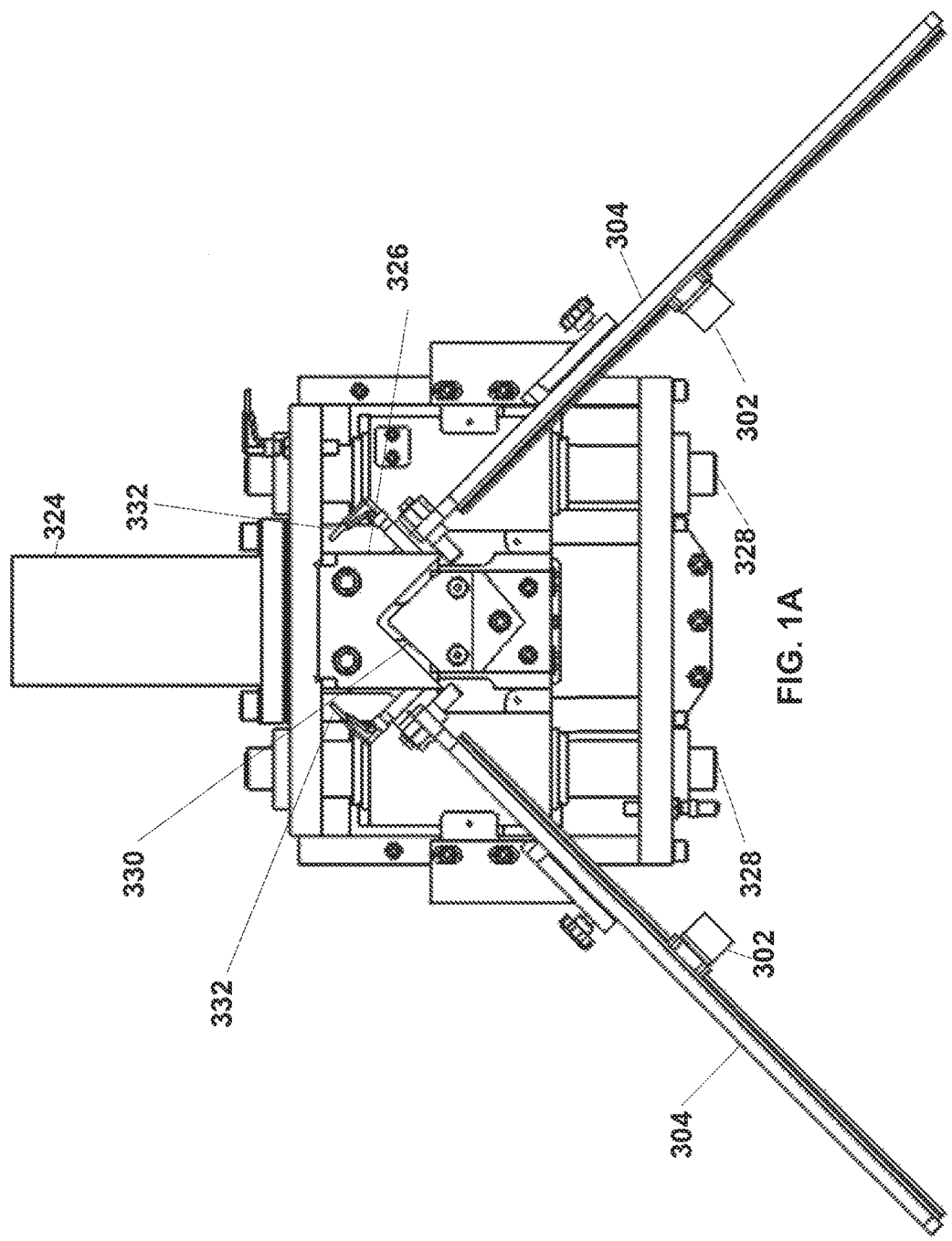

METHOD AND DEVICE FOR FORMING FROM A FLAT SHEET MATERIAL A CORNER BOUNDED BY THREE SIDES

TECHNICAL FIELD

The present invention is generally directed to a method of forming a corner region from a flat sheet. More particularly, the present invention is directed to forming a sheet metal plate. Even more particularly, the present invention is directed to trimming a corner region bounded by three sides that has been formed from a flat sheet.

BACKGROUND OF THE INVENTION

It is known in the prior art that if a cover or similar is to be provided on a metal housing, it is made starting from a sheet, which is shaped into a box-shaped component. Rectangular/square cut-outs are made in the four corners of a rectangular standard flat sheet metal plate. The plate is then folded along the four side edges in order to form the four side walls. The corresponding end parts of the oppositely lying side walls are then welded together in order to form a corner region. These corner regions may be finished by means of a polishing machine.

U.S. Pat. No. 6,895,796 issued on May 24, 2005 to Markus Harmeter described an apparatus and method for trimming the work piece in such a forming process. More particularly the patent teaches the method of forming a corner region of a flat plate having side edges comprises the steps of folding down the side edges of the flat plate by a predetermined height from a plate in which the flat plate extends to form two intersecting side walls having free end faces and an excess projection in the corner region where the side walls intersect, placing the free end faces of the side walls on guide surfaces of bearing elements for the side walls, placing the excess projection between two cutting elements having cutting edges in alignment with the guide surfaces of the bearing elements, and separating the excess projection by displacing one of the cutting elements against the other cutting element. More particularly, Harmenter teaches guide surfaces that are perpendicular to the formed corner side wall. Accordingly the cutting edges aligned with the guide surfaces move precisely in a direction that is parallel to plane that is perpendicular to each side wall.

A problem with the prior art method and apparatus described therein is that the process of separation of the excess projection results in burring of the free end faces of the side walls. In addition, the side wall cut often results in an edge that does not have all points within a single plane much less a plane that is perpendicular to the respective side walls of the formed corner. FIGS. 7 and 8 herein illustrate examples of imprecision in the formation of trimmed side wall of a corner bounded on three sides from a flat sheet material. FIG. 6 illustrates a precisely formed side wall of a corner bounded on three sides from a flat sheet material. Accordingly, it is therefore seen that there exists a need in the art to overcome these deficiencies and limitations.

The present invention includes the method as well as apparatus that is free standing and independent of another forming apparatus as well the method and apparatus that is physically integrated with known preprocessing apparatus such as the prior art apparatus described in the Harmenter patent as well as work pieces formed by other means such as an edge-folding press. To best illustrate possible cooperation with the prior art apparatus this description will refer specifically to the prior art apparatus described in the Harmenter patent including some of the specific drawings shown in the Harmenter patent to describe an embodiment of the present invention that in addition to trimming the formed corner also forms the corner.

FIGS. 26 and 27 of Harmenter provide a detailed illustration of the cutting device 113 of the prior art corner-shaping device 4. On the cutting plate 14, the stationary cutting element 157 is detachably secured by a bottom face 186 extending parallel with the cutting plate 14, e.g. at a distance 187 from the cutting plate 14 by means of a spacing batten 185. Accordingly, the cutting element 157 acts as a cutting edge 163 projecting beyond the spacing batten 185 in the direction of the displaceable cutting element 158, formed by the bottom face 186 and an end face 188 extending perpendicular to the cutting plate 14. The distance 187 corresponds more or less to a thickness 189 of the displaceable cutting element 158, which is guided on the cutting plate 14 in a linear displacement driven by the drive system 160, e.g. a pressurized cylinder, and forms the cutting edge 164 with the front end face 168 and a top face 190. In this prior art method and apparatus the displaceable cutting element 158 advances toward the formed corner sides in a direction that is precisely perpendicular as shown in FIG. 26.

On an end face 188, the cutting element 157 is provided with a V-shaped cut-away 191 adapted to the corner region 10 of the component 2 to be cut, directed towards the cutting element 158. The displaceable cutting element 158, on the other hand, has a nose-shaped projection 192 opposite the stationary cutting element 157 which is of the same shape as the cut-away 191 and forms the front end face 168. Clearly, the cut-away 191 has an internally rounded contour in the corner region 10 adapted to the component 2 and the projection 192 has a matching externally rounded contour.

When shaping the corners, in order to trim and remove the projection 194 standing out from the resultant end faces 193 of the side walls 8 in the corner region, the component, with its opening directed towards the displaceable cutting element 158, is manually positioned with the end faces 193 flat against the latter and the corner region 10 in the cut-away 191. When the cutting element 158 is displaced by the drive system 160 towards the stationary cutting element 158, a cut is made along the end faces 193 of the component 2 in the corner region 10 to remove the projection 194.

When the component 2 is placed on the base plate 195 in readiness for the cutting process, an infeed is activated by the drive 196 of the tool holder 198 in the direction of arrow 200, until the displaceable cutting element 158 bears on the end faces 193 of the side walls 8 with a bottom face 201. The bottom face 201 of the displaceable cutting element 158 is aligned flush with a top face 202 of the stationary cutting element 157. The cutting position has therefore been reached and the displaceable cutting element 158 is displaced via the drive system 160 in the direction of arrow 203 and hence towards the stationary cutting element 157 until the side wall 8 of the component 2 bears on the end face 188 of the stationary cutting element 157. As displacement continues in the direction of arrow 203, the projection 194 produced when shaping the corner is trimmed exactly flush with the end faces 193 due to the co-operation of the cutting edges 163, 164 with the cutting elements 157, 158. After the cutting process, the tool holder 198 is displaced by the drive 196 in the direction opposite arrow 200 into an open position at a distance from the base plate 195, after which the component 2 can be removed from the cutting device 113.

As may also be seen from FIGS. 26 and 27 described above in relation to the cutting device 113, as the projection 194 is trimmed, an exactly flush path to the end faces 193 of the side walls 8 is achieved due to the fact that bearing elements 205 forming guide surfaces 204 are provided, either on the cutting plate 14 or separately from it or from the machinery 101, on which the component is laid by its end faces 193 of the side walls 8 and in its corner region 10 with the projection 194 projecting between the cutting elements 157, 158. The cutting elements 157, 158 are arranged so that the cutting edge 163 of the cutting element 157 and the cutting edge 164 of the cutting element 158 are disposed running in the guide surface 204 formed by the bearing elements 205. As the cutting process proceeds, i.e. by displacing the displaceable cutting element 158 relative to the stationary cutting element 157, the projection 194 standing out by a height 206 of the side walls 8 is trimmed exactly flush in order to achieve the height 206 of the side walls 8, even in the corner region 10, without any discrepancy.

As may also be seen from the broken lines of FIG. 27, another option is to provide the displaceable cutting element 158 with bearing elements 205 on it in the form of projections, so that the component 2 is supported by its side walls 8 in the immediate vicinity of the corner region 10 to be cut.

As may also be seen from FIG. 25, a height 212 of the tool 16 or the peripheral shaping surfaces 36 is greater than the height 206 of the side walls 8 of the component 2. In any event, the height 212 of the shaping surfaces 36 amounts to a measurement corresponding to the height 206 of the side walls 8 plus an anticipated height 213 of the projection 194. As a result, this ensures that when shaping the corner region 10, the projection 194, once formed by the roll, will always lie flat in the region of the shaping surfaces 36 and will not be drawn in against the bottom face of the tool 16 under any circumstances, which would result in jamming, making it more difficult to remove the component 2 once the corner region 10 had been formed.

SUMMARY OF THE INVENTION

Accordingly, it is an object of the present invention to prevent burring of the free end faces of the respective side walls of the corner formed from a sheet stock.

It is another object of the present invention to provide a method and apparatus to form a corner from sheet material and to trim the side walls formed to produce an edge that has all points within a single plane and more particularly in a plane that is perpendicular the respective side walls of the formed corner The shortcomings of the prior art are overcome and additional advantages are provided through a method of forming a corner region of a flat plate having side edges, comprising the steps of (a) folding down the side edges of the flat plate by a predetermined height from a plane in which the flat plate extends to form first and second intersecting side walls having respective first and second free end faces and an excess projection in the corner region where the side walls intersect, (b) placing the first and second free end faces of the side walls respectively on first and second guide surfaces of respective first and second bearing elements for the first and second side walls, (c) placing the excess projection between two cooperating cutting elements having cutting edges in oblique relationship with the guide surfaces of the bearing elements, and (d) separating the excess projection by displacing one of the cutting elements against the other cutting element. Accordingly, the bearing elements are fixedly held and the cutting elements are displaceable relative to the bearing elements in oblique relation to the side walls.

In some forms of the method the oblique relationship includes the cutting elements being displaceable relative to the bearing elements at an angle that is greater than zero degrees and less than six degrees with respect to a virtual plane that is normal to the side walls. The method may have the cutting elements displaceable relative to the bearing elements at an adjustable height relative to the bearing elements as well as at an adjustable angle relative to the surface of the side walls.

The present invention also includes a system for forming a three-dimensional corner region of a flat plate, which includes (a) a tool having a top face and shaping surfaces adapted to form two folded-down intersecting side walls of the flat plate in the corner region, (b) a clamping device for clamping the flat plate to the top face of the tool, (c) a roller system with a roll displaceable perpendicularly to the top face for folding down the side walls over a predetermined height from a plane in which the flat plate extends to form the two intersecting side walls having free end faces and an excess projection in the corner region where the side walls intersect, (d) first and second supports for the respective first and second side walls adapted to support the free end faces of the side walls, and (e) first and second cutting elements having cutting edges disposed in oblique relation with the guide surfaces of the bearing elements and arranged to receive the excess projection therebetween, one of the cutting elements being displaceable in a direction that is oblique to a virtual plane that is normal to the side walls against the other cutting element to separate the excess projection.

In some embodiments the cutting element that is displaceable in a direction that is oblique to a virtual plane that is normal to the side walls is displaceable in a direction that is between more than zero and six degrees with respect to a plane that is normal to the side walls.

The invention also includes apparatus for trimming an associated corner region having first and second side surfaces formed from a flat plate and each side surface having a free end referred to as a side edge wherein the apparatus includes a die and a knife assembly in which the die is movable in opposed reciprocating directions within a plane; a support assembly for holding the associated corner region by the first and second side edges, said support assembly positioning the associated corner region with respect to said plane; said support assembly including first and second elongated pivotally mounted rails each including respective first and second supports carried thereon that are each dimensioned and configured to hold the associated corner region physically oriented with respect to (1) said plane and (2) said die and knife assembly with the side surfaces disposed at an oblique angle with respect to said plane. In some embodiments the oblique angle that is between more than zero and six degrees. Each of the supports may be L-shaped and may be dimensioned and configured for sliding movement along an axial part of a rail.

In other forms of the system for forming a three-dimensional corner region of a flat plate as described the first and second supports for the respective first and second side walls adapted to support the free end faces of the side walls are independently mounted whereby the angular relationship between the two cooperating cutting elements as well as the height of each sidewall relative to the two cooperating cutting elements are adjustable.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1A is a top view of the apparatus shown in FIG. 1;

DETAILED DESCRIPTION

As previously described the present invention includes a method and apparatus that is (1) independent of other apparatus or (2) associated with known preprocessing apparatus such as the prior art apparatus described in the Harmenter patent as well as work pieces formed by other means such as an edge-folding press. For simplicity of description the following will refer specifically to the prior art apparatus described in the Harmenter patent. More specifically, the following description will refer to some of the specific drawings shown in the Harmenter patent to describe one possible application of the present invention.

Figure 1:
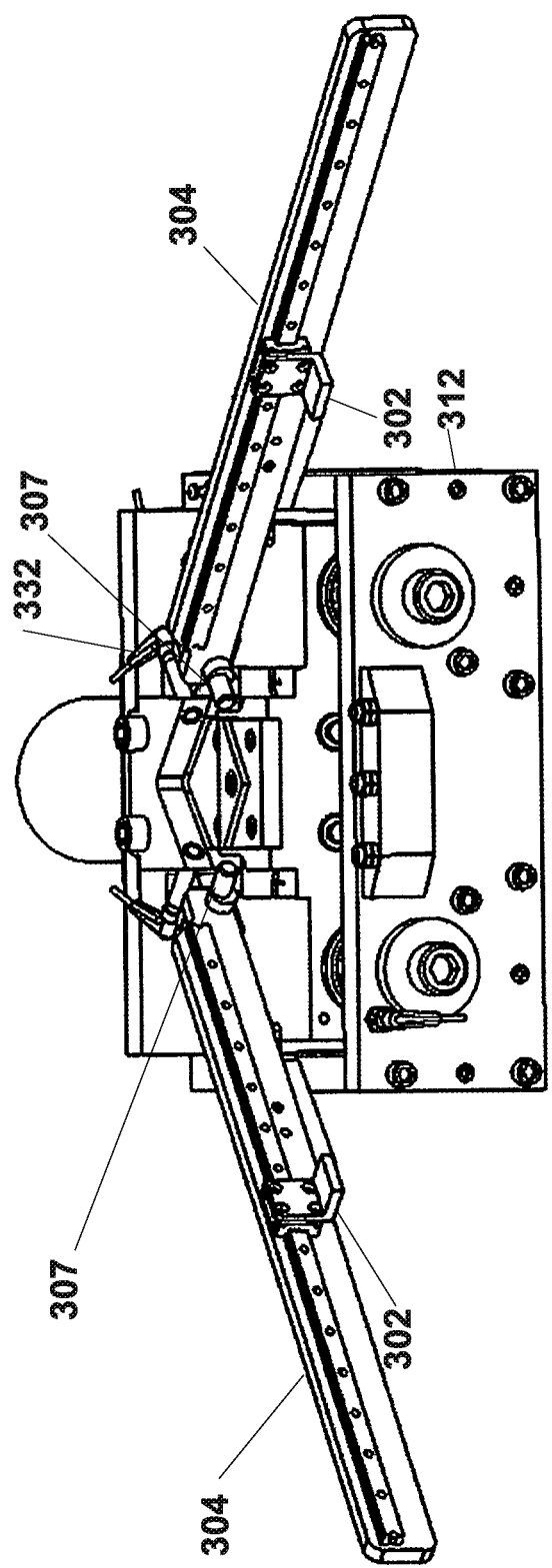
FIG. 1 is a perspective view of one embodiment of the apparatus in accordance with one form of the present invention.
Figure 2:
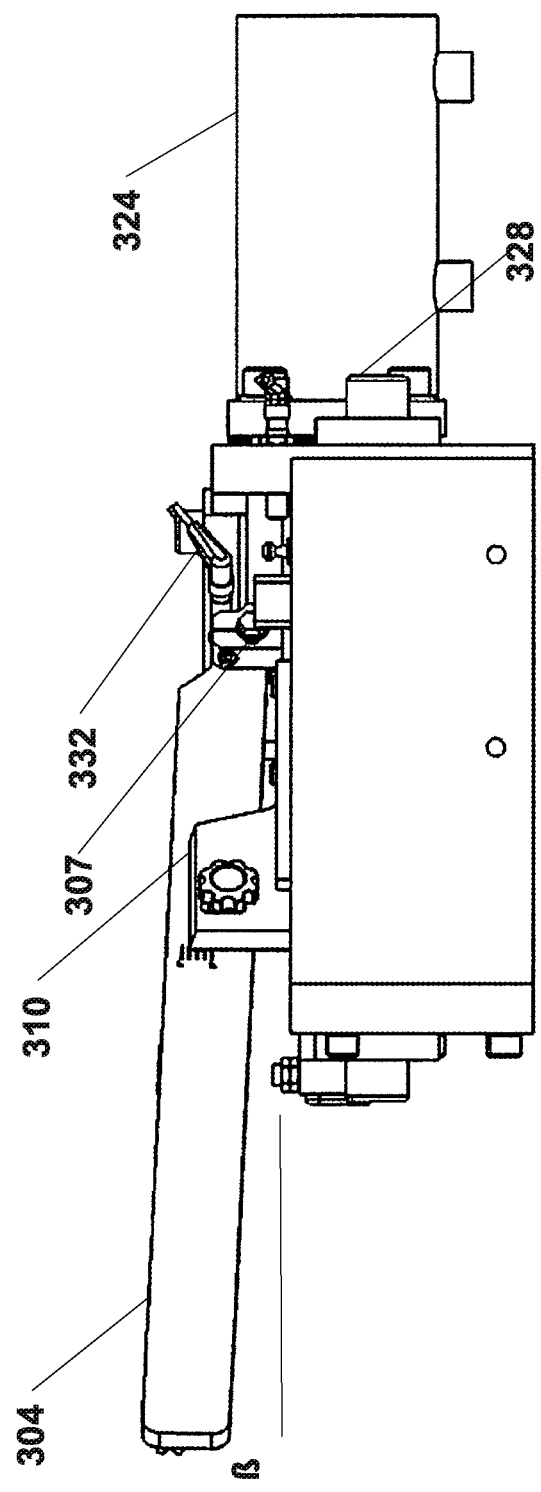
FIG. 2 is a right side view of the apparatus shown in FIG. 1.
Figure 3:
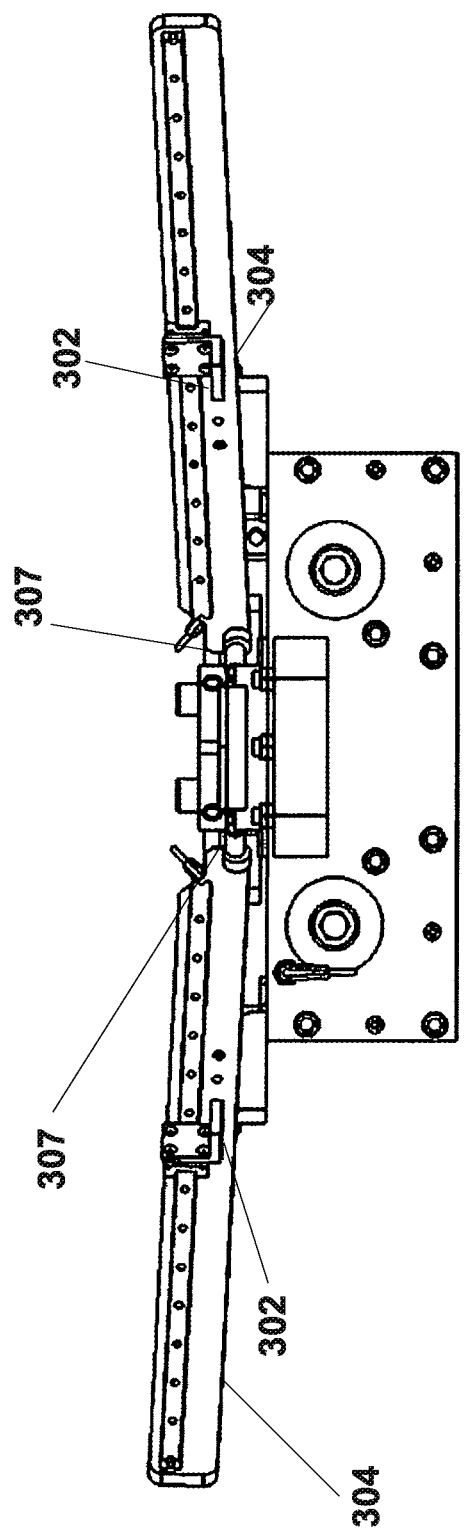
FIG. 3 is a front view of the apparatus shown in FIG. 1.
Figure 4:
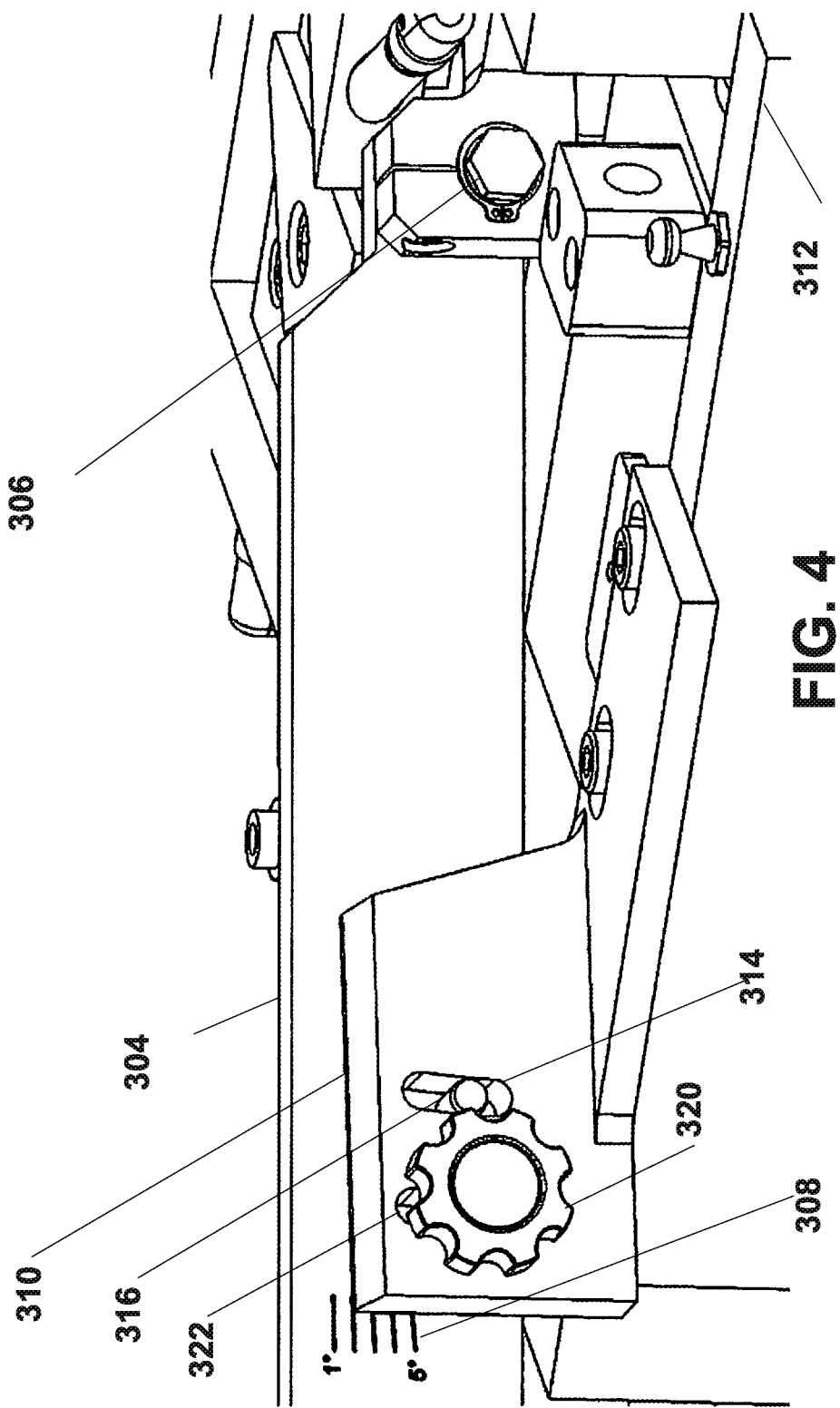
FIG. 4 is detailed view to an enlarged scale of the adjustment mechanism illustrated in FIG. 1 and the eccentric support surface at the front of the workpiece facilitating the overall height adjustment of the workpiece.
Figure 5:
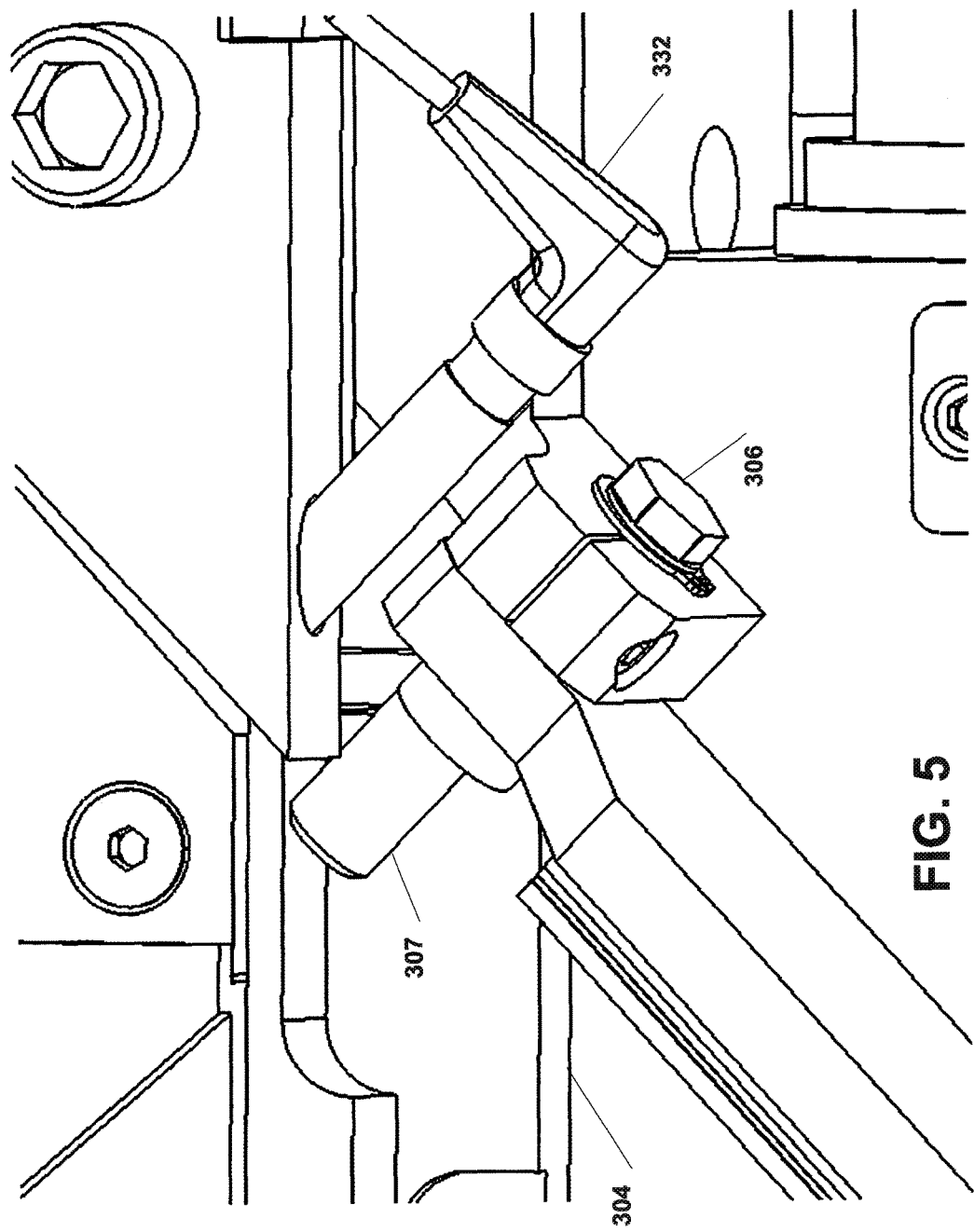
FIG. 5 is another detailed view to an enlarged scale of the pivot point OD, the adjustment mechanism illustrated in FIG. 1.
Figure 6:
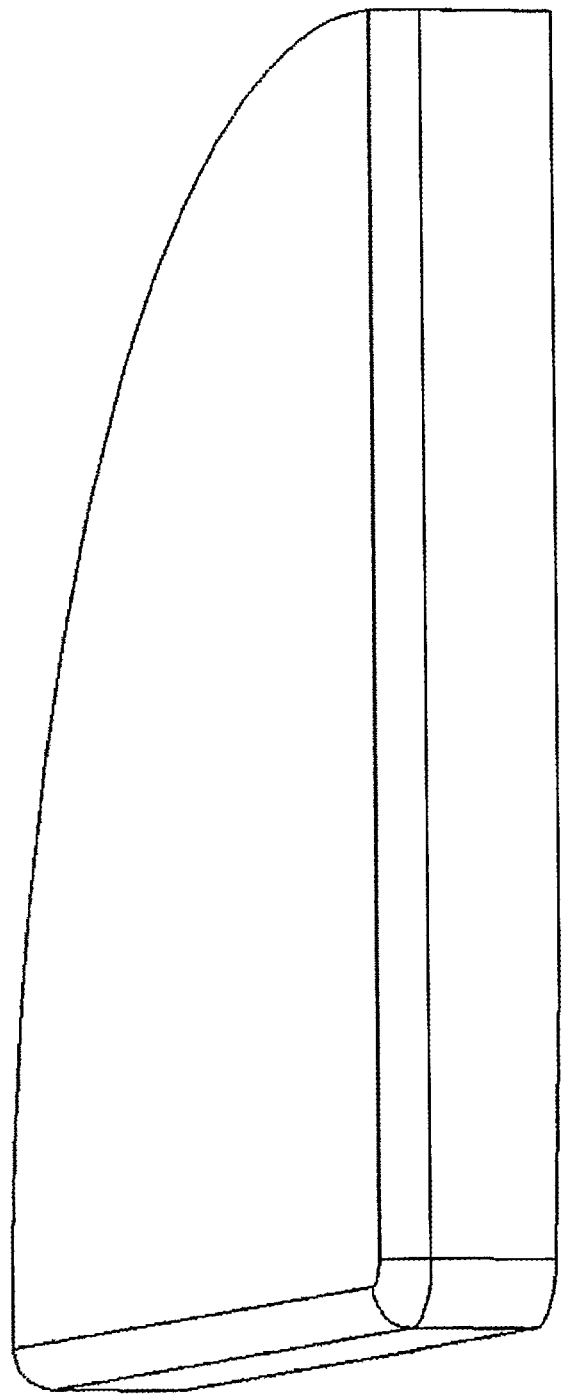
FIG. 6 is an illustration of corner formed from a sheet of metal and trimmed by the apparatus of the present invention.
Figure 7:
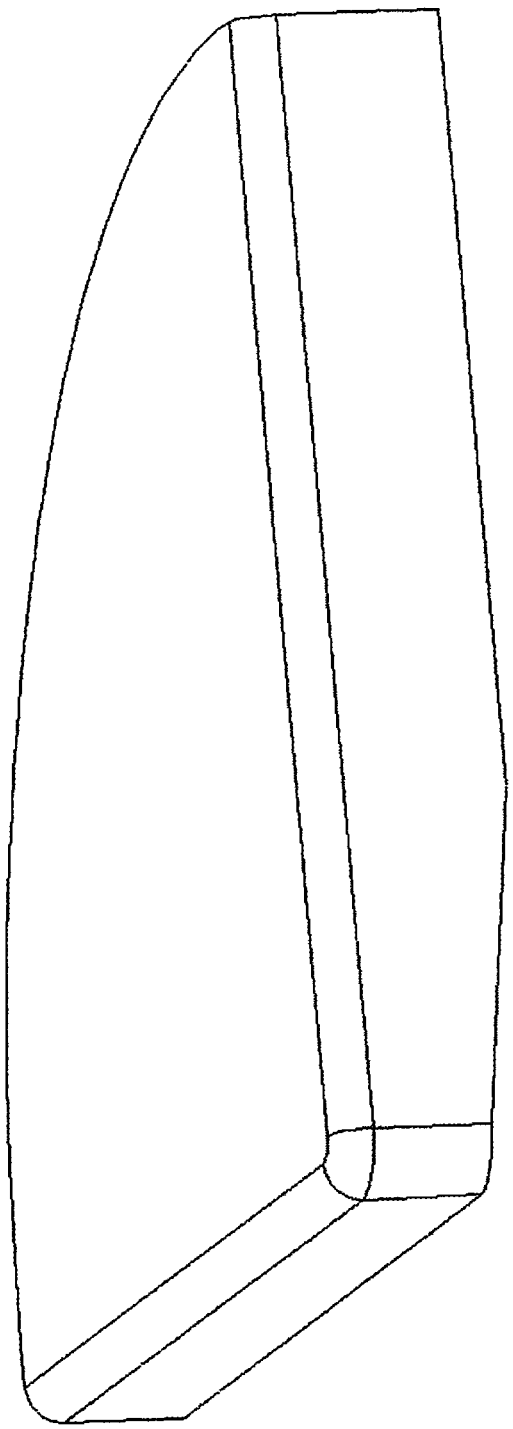
FIGS. 7-8 are illustrations of corners formed from respective sheets of metal and trimmed by prior art trimming devices and which illustrates the deficiencies of the manufacture resulting from the prior art method and apparatus.
Figure 8:
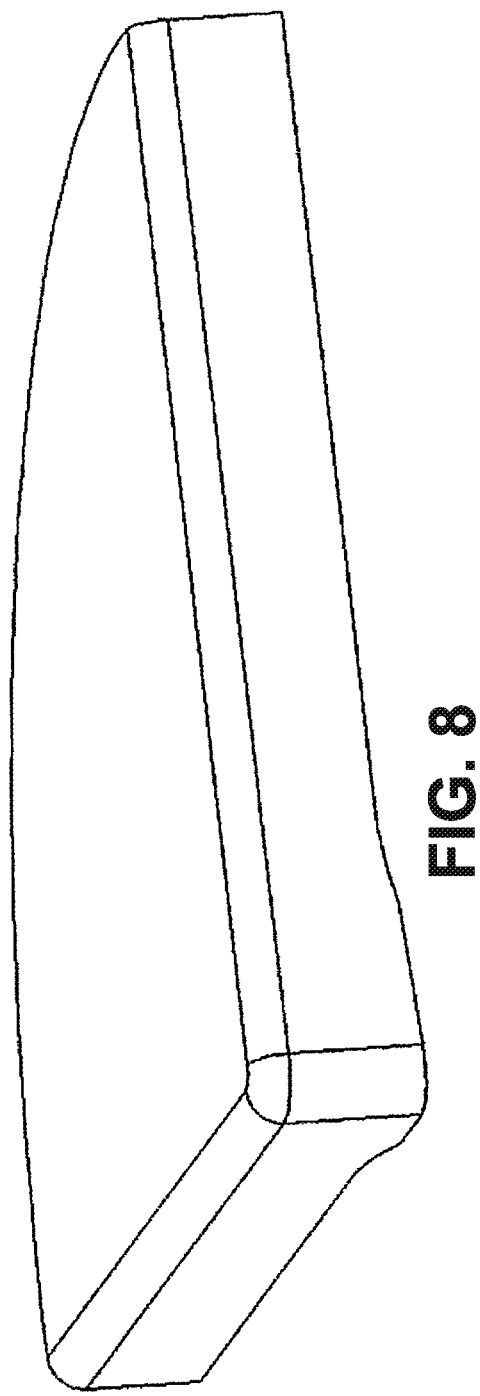

One embodiment of the present invention includes a corner-shaping device to form a box-shaped component as well as a fixed element and a displaceable cutting element to trim the box-shaped component. Unlike the prior art such as Harmenter the present method and apparatus does not advance a displaceable cutting element toward the formed corner sides in a direction that is precisely perpendicular as shown in Harmenter FIG. 26. Furthermore, the present invention includes the method and apparatus for varying the angle between the direction of movement of the displaceable cutting element and a virtual plane that is perpendicular to the side walls of a corner bounded on three sides from a flat sheet material. The variation of this angular relationship is of course achieved by orientation of the work piece with respect to the displaceable cutting element. More particularly, the manner of holding the work piece in the present invention allows the user to vary the angle β between the direction of movement of the displaceable cutting element and a virtual plane that is perpendicular to the side walls of a corner bounded on three sides from a flat sheet material as shown in FIG. 2.

As seen in FIGS. 1-5 the work piece in the illustrated embodiment of the present invention is supported on respective work piece supports 302 carried by respective rails 304. Each work piece support 302 is carried on a rail 304 in a manner that allows axial travel to facilitate cooperation with work pieces of different sizes. (For clarity elements of the structure shown in FIGS. 1-5 are identified by reference numerals 302 or higher to avoid confusion with structure that is described in descriptions that are incorporated by reference.) Each bolt 306 has a first axial part and a coaxial hexagonal head. The free end of the bolt 306 includes an eccentric cylindrical surface 307 having a geometric axis that is parallel to and spaced apart from the geometric axis of the first axial part. The rails 304 are each pivotally mounted for movement about the respective geometric axes of cylindrical surfaces 307. Thus, turning the hexagonal head of the bolt 306 causes the cylindrical surface 307 to move the rail 304 to move and thereby adjust the rail 304 to control both the height and angle of the workpiece relative to the displaceable cutting element. The angle β ordinarily will be adjustable within the range of larger than zero degrees to 6 degrees. An angle of 1 degree works particularly well for many materials. Indicia on the respective rails 304 facilitates adjustment of the angle R. A support 310 is fixed to the housing 312 by a plate 320. The support 310 is provided with a slot 314 for engaging a pin 316 carried by the rail 304 to guide pivotal movement of that rail 304. A locking mechanism 320 cooperates with slot 322 to lock the rail 304 in a specific angular position. It will be understood that each rail 304 is individually adjustable. The normal and customary use and construction of the apparatus in accordance with the present invention will allow both rails to be pivotally adjustable and both will be ordinarily be adjusted to the same angle at all operational times. Although both rails will ordinarily be adjusted to the same angle different angles will be required for parts that are not symmetric.

The apparatus also includes a cylinder 324 for moving a displaceable knife 330 (mounted on guides 328) with respect to a cutting element or die 326. A sensor 332 is provided for work piece detection.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for trimming a three-dimensional corner region manufactured from a flat plate by a tool having a top face and shaping surfaces adapted to form two folded-down intersecting side walls of the flat plate in the corner region having free end faces and an excess projection in the corner region where the side walls intersect which comprises
    a clamping device for clamping the flat plate to the top face of a tool;
    first and second supports for said two folded down intersecting side walls, said supports being adapted to support the free end faces of the side walls;
    a knife having a first planar face and a die having a second planar face, said first and second planar faces being disposed in abutting relationship and defining a virtual plane therebetween, said first planar face being displaceable with respect to said second planar face between a first position and a second position said knife also being displaceable with respect to said folded down side wall whereby movement of said knife from said first position to said second position severs a free end of said side walls;
    said virtual plane being disposed in oblique relationship to said sidewalls, said virtual plane being oblique to a plane that is normal to the side walls whereby an edge is formed on the free end face of each side wall that is perpendicular to the sidewall and has more points on the edge formed on the free end that are disposed in a single plane that is perpendicular to the sidewall than if the virtual plane is disposed in a direction that is parallel to a plane is normal to the side wall.

2. The system as described in claim 1 wherein said virtual plane is oblique to a plane that is normal to the side wall and is disposed at an angle of between more than zero and six degrees with respect to a plane that is normal to the side walls.

3. A system for removing the excess projection of a three-dimensional corner region as described in claim 1 wherein said first and second supports for the respective first and second side walls are adapted to support the free end faces of the side walls are independently mounted whereby the angular relationship between the two cooperating cutting elements as well as the height of each sidewall relative to the two cooperating cutting elements are adjustable.

4. A system for trimming a three-dimensional corner region of a flat plate, which comprises:
    means for trimming a flat plate having two folded-down intersecting side walls of the flat plate where the intersecting side walls have free end faces and an excess projection in the corner region where the side walls intersect;
    (a) means for clamping the flat plate,
    (b) first and second means for supporting the free end faces of the respective first and second side walls adapted, and
    (c) means for cutting the excess projection including a displaceable knife having a first planar face and a die having a second planar face, said first and second planar faces being disposed in abutting relationship and defining a virtual plane therebetween, said knife also being displaceable with respect to said excess projection in a direction that is oblique to a virtual plane that is normal to the side walls, whereby said knife separates the excess projection whereby an edge is formed on the free end face that has more points on the edge formed on the free end that are disposed in a plane that is perpendicular to the sidewall than if the cutting element is displaceable in a direction that is parallel to a virtual plane that is normal to the side walls.

5. The system as described in claim 4 wherein said direction that is oblique to a virtual plane is a direction that is a direction that is disposed at an angle of between more than zero and six degrees with respect to a plane that is normal to the side walls.

6. A system for removing the excess projection of a three-dimensional corner region of a flat plate as described in claim 4 which further includes:
    first and second supports for the respective first and second side walls adapted to support the free end faces of the side walls are independently mounted whereby the angular relationship between the two cooperating cutting elements as well as the height of each sidewall relative to the two cooperating cutting elements are adjustable.

* * * * *